Figure 3:
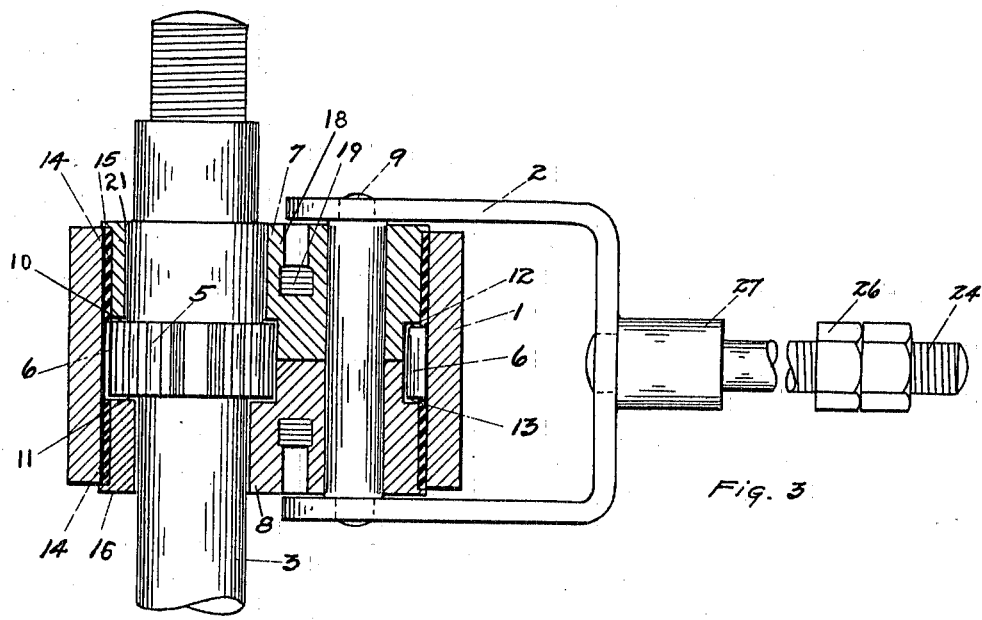

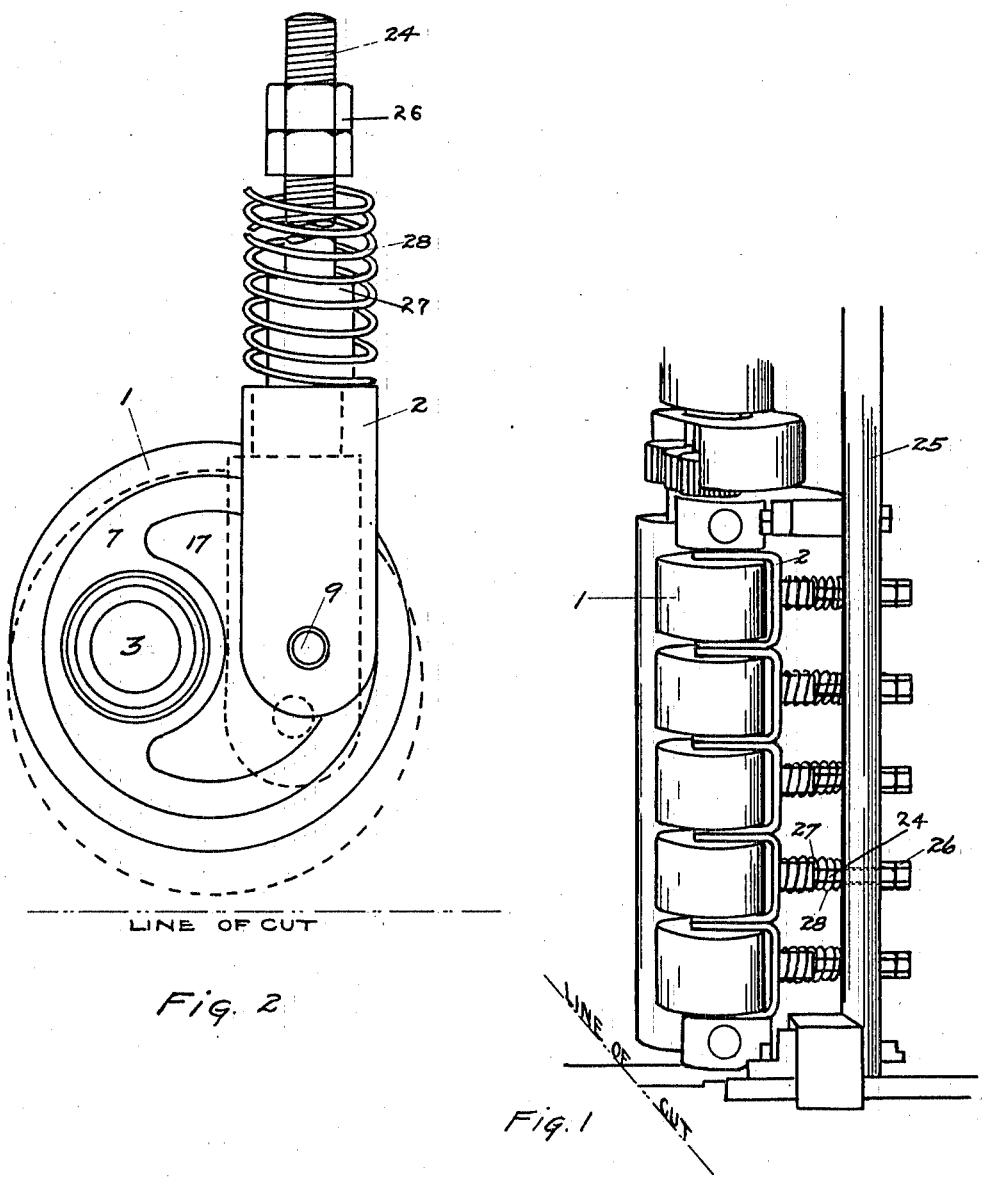

G. G. RHINEVAULT.
BROKEN ROLL.
APPLICATION FILED FEB. 20, 1912.

1,059,486.

Patented Apr. 22, 1913.
4 SHEETS—SHEET 2.

WITNESSES:
Geo. W. Smith.
Christine A. Braidel.

Glenn G. Rhinevault, INVENTOR

BY
Geo. B. Willcox, ATTORNEY

COLUMBIA PLANOGRAPH CO., WASHINGTON, D. C.

G. G. RHINEVAULT.
BROKEN ROLL.
APPLICATION FILED FEB. 20, 1912.

1,059,486.

Patented Apr. 22, 1913.
4 SHEETS—SHEET 3.

WITNESSES:
Geo. W. Smith
Christine A. Braidel.

INVENTOR
Glenn G. Rhinevault.
BY
Geo. B. Willcox. ATTORNEY

COLUMBIA PLANOGRAPH CO., WASHINGTON, D. C.

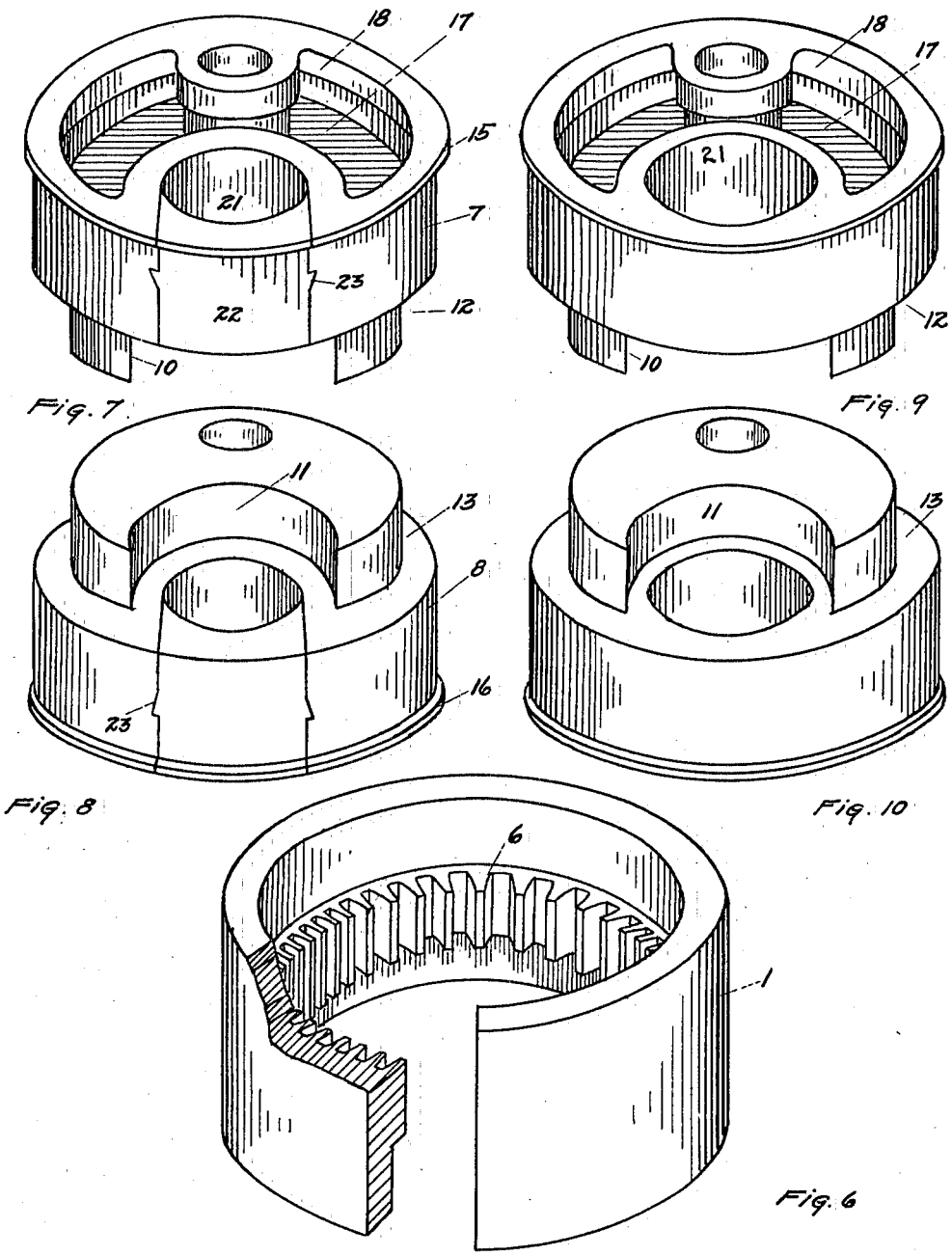

UNITED STATES PATENT OFFICE.

GLENN G. RHINEVAULT, OF SAGINAW, MICHIGAN, ASSIGNOR TO WM. B. MERSHON & CO., OF SAGINAW, MICHIGAN, A CORPORATION OF MICHIGAN.

BROKEN ROLL.

1,059,486. Specification of Letters Patent. Patented Apr. 22, 1913.

Application filed February 20, 1912. Serial No. 678,909.

*To all whom it may concern:*

Be it known that I, GLENN G. RHINEVAULT, a citizen of the United States, residing at Saginaw, in the county of Saginaw and State of Michigan, have invented certain new and useful Improvements in Broken Rolls; and I do hereby declare the following to be a full, clear, and exact description of the invention, such as will enable others skilled in the art to which it appertains to make and use the same.

This invention relates to feed rolls such as are commonly used in machines for resawing boards, and the improvement pertains more particularly to the construction of such a feed roll made up of a number of short sections placed end to end, comprising what is commonly known as a broken roll, all of the sections being rotated positively in the same direction, but each section being capable of bodily movement sidewise with relation to the remaining sections without affecting either the driving power or the peripheral speed of rotation of the sections.

In various arts there are many uses for sectional rolls of this nature, but since broken rolls are especially well adapted for use in band resawing machines, my invention will be described for convenience in this specification as being used on resawing machines.

To illustrate some of the general conditions of use of the device, I will cite for example, the resawing of certain kinds of lumber used in the manufacture of box shooks.

It is customary for box manufacturers to dovetail together odd pieces of scrap lumber to form a slab of considerable width; to surface one side of the slab and then to pass it through a resawing machine, the surfaced side of the slab lying against the fixed rolls of the machine in its passage through the saw. The yielding rolls, if made in a single piece, as is now common, will ride usually at only one place on the slab, where the built-up piece happens to be thickest, allowing the other portions of the slab to spring away from the fixed roll, producing a resawed board of uneven thickness and often spoiling it. Therefore, it becomes necessary to provide a yielding roll that will not only positively feed the slab forward, but will by reason of its yieldingly-mounted independent power-driven sections press against the slab at a number of places so as to prevent the slab from springing away from the fixed rolls and thereby insure an even cut. It is desirable in this class of work that the rolls be of relatively small diameter and yet be capable of a considerable yielding movement toward and from the line of cut, the rolls being usually made about four inches in diameter, each section being capable of an independent lateral movement of about five-eighths of an inch toward and from the line of cut. My invention provides mechanism for accomplishing these results.

The invention also comprises certain constructions and combinations and the equivalents thereof, which will be described in the specification and pointed out in the claims.

Figure 4:
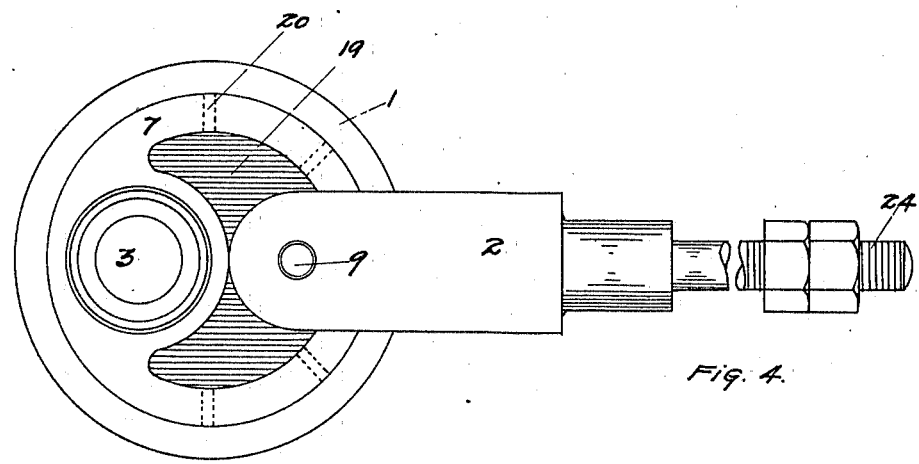
Figure 11:
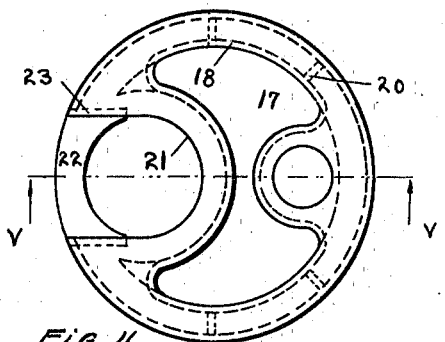
Figure 15:
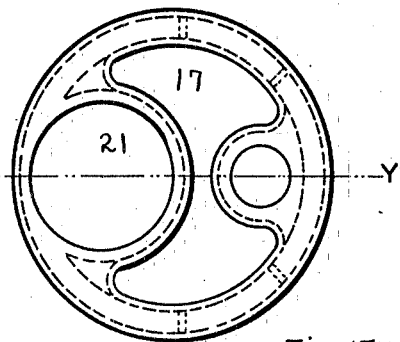
Figure 12:
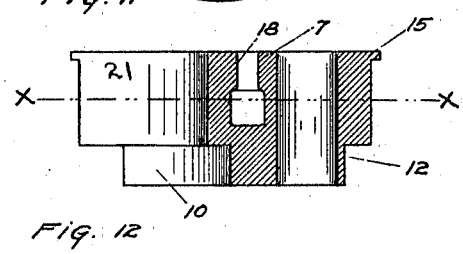
Figure 16:
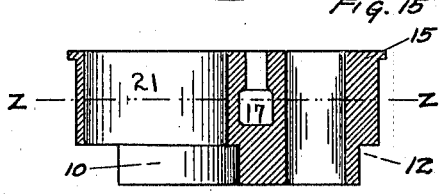
Figure 13:
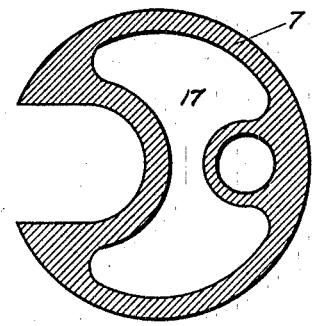
Figure 5:
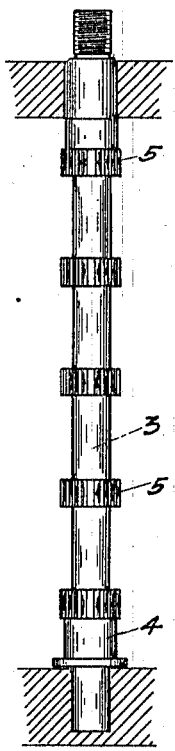
Figure 17:
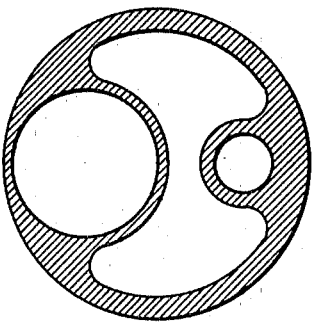
Figure 14:
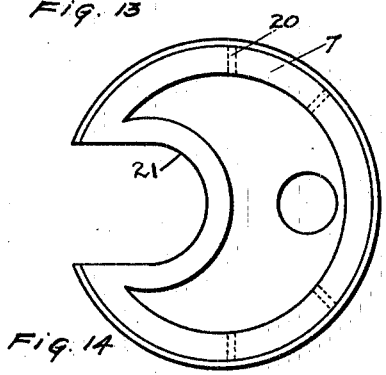
Figure 18:
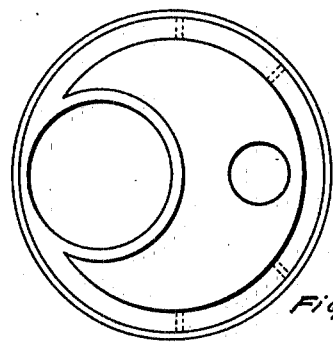

In the drawings, Figure 1 is a perspective view showing my improved broken roll mounted in the roll frame of a resawing machine; Fig. 2 is a top plan view of a roll section with its supporting yoke attached, the yielding movement of the roll and yoke being indicated by dotted lines; Fig. 3 is a vertical section through one of the roll sections, with the yoke turned out of its normal position for better illustration; Fig. 4 is a top plan view of the parts shown in Fig. 3; Fig. 5 is a side view of the shaft and pinions by which the roll sections are driven; Fig. 6 is a broken perspective view of the shell of a roll section; Figs. 7 and 8 are respectively perspective views of the upper and lower journal members of a roll section; Figs. 9 and 10 are modified forms of the parts shown in Figs. 7 and 8; Fig. 11 is a top plan view of the journal sections shown in Fig. 7; Fig. 12 is a transverse section taken on the line v—v of Fig. 11, the removable block being omitted; Fig. 13 is a horizontal section on the line x—x of Fig. 12; Fig. 14 is a bottom plan view of the parts shown in Fig. 12; Fig. 15 is a top plan view of the modified form shown in Fig. 9; Fig. 16 is a vertical section taken on the line y—y of Fig. 15; Fig. 17 is a horizontal section on the line z—z of Fig. 16; Fig. 18 is a bottom view of the parts shown in Fig. 16.

Referring to Fig. 1, the roll sections are shown arranged vertically, each section being adapted for independent movement toward and from the line of cut by contact with the slab as it passes through the machine, each section being guided by a spring-pressed yoke mounted on a vertical support attached to the frame of the machine.

1 is the outer revolving shell of the roll section, and 2 is the spring-pressed yoke.

Referring to Figs. 2, 3 and 5; 3 is a shaft revolubly mounted in bearings carried by the roll frame of the machine, the shaft being driven by any suitable means, as by a train of gears located at the top of the roll frame in the usual manner, as shown in Fig. 1. When the shaft is to be used in vertical position, as shown in Figs. 1 and 5, I provide a removable sleeve or foot-step collar bearing 4 to sustain part of the weight of the shaft and the parts supported by it. On the shaft 3 are pinions 5, one for each roll section.

As shown in Fig. 3, the cylindrical shell 1 surrounds pinion 5 and an internal gear 6 carried by the shell is in mesh with the pinion, so that the revolving of the pinion drives the shell.

To support the shell in proper drive relation with the pinion and to permit the shell to move toward and from the line of cut without interfering with the proper meshing of the gear and pinion, I provide a journal upon which the shell revolves, the journal preferably comprising the following devices.

Two members, which I term the upper journal member 7 and the lower journal member 8 are swiveled eccentrically upon the shaft and are received within the shell 1, the peripheries of these journal members serving as bearings, upon which the shell 1 turns when pinion 5 rotates.

The upper and lower journal members 7 and 8 are preferably held together by a yoke pin 9 carried by the yoke 2, the yoke being arranged in practice as shown in Fig. 2, extending approximately at right angles to the diametrical line that connects the center of shaft 3 with the center of pin 9, so that movement of the roll section toward and from the line of cut will produce longitudinal movement of the yoke 2 and vice versa.

To receive pinion 5, I provide members 7 and 8 with recesses 10 and 11 respectively, and similarly, to receive the teeth of gear 6 I provide an annular recess 12 around the lower periphery of member 7 and a similar annular recess 13 around the upper periphery of member 8, so that the members 7 and 8, when placed together as shown in Fig. 3, will provide a cavity, within which pinion 5 is received, and an annular groove within which the teeth of internal gear 6 are received. To reduce the wear between the inner face of shell 1 and the bearing surfaces of the journal members 7 and 8, I may insert an antifriction lining, as a layer of fiber 14. To keep out dirt, the upper and lower extremities of members 7 and 8 may be provided respectively with flanges 15 and 16 that project over the joint formed by the rubbing surfaces, as shown in Fig. 3.

Lubrication may be provided by recessing the outer faces of the journal members to form pockets 17 with inwardly-projecting flanges 18. A pad 19 of felt or other absorbent material is inserted in the bottom of the pocket and is held in place by the flanges 18. Oil holes 20 conduct lubricant from the pad to the surface of the journal.

In practice I prefer to form the shaft 3 and pinion 5 in a single piece, in which case it is not convenient to assemble the middle sections by sliding the members 7 and 8 over the shaft lengthwise, for the reason that the pinion 5 is larger than the holes 21 through which shaft 3 passes and by which the journal members are swiveled on the shaft. To overcome this difficulty, large bushings ordinarily have to be provided at considerable expense. I, therefore, prefer to provide for members 7 and 8 of these middle sections a modified construction substantially as illustrated in Figs. 7, 8 and 11, in which 22 is a block of metal equal in width to the diameter of hole 21, the block being removably inserted in the journal member and held in place by guides 23 that slide into grooves formed in the journal member. When blocks 22 are removed, journal members 7 and 8 may be slipped sidewise over the shaft and pinion, and blocks 22 are then put in place, after which the journal members are brought together and entered in the shell 1, as indicated in Fig. 3.

The outer journal member of the upper pinion on shaft 3, and of the lower pinion also if desired, can be assembled by slipping it over the end of the shaft and, therefore, it need not be provided with the removable block 22 above described, but may be made in one piece as shown in Figs. 15 to 18.

The yoke 2 is provided with a threaded stem 24 which passes slidingly through an opening in a fixed member, as post 25, the limit of sliding movement being determined by the adjustment of nuts 26 on one side of the post and by a shoulder 27 formed on the stem 24 and located on the other side of the post. A compression spring 28 is inserted between the post and the yoke to keep the yoke and roll section pressed normally outward.

While I have shown and described certain specific details of construction, as for instance, details of the shell 1 and journal members 7 and 8, it will be understood that these devices are susceptible of various modifications without departing from the spirit of my invention.

Having described my invention, what I claim and desire to secure by Letters Patent, is:—

1. A roll-section comprising, in combination with a revoluble shaft, a pinion fixed to said shaft, an internal gear in mesh with said pinion, a shell carried by said gear, and a journal member adapted to revolubly support said shell, said journal member comprising upper and lower cylindrical sections formed with recesses at their adjacent ends to receive respectively the pinion and internal gear, each of said members provided with an opening through which said shaft passes, a removable block equal in width to said shaft opening, and means adapted to allow oscillation of the journal member.

2. A roll-section comprising, in combination with a revoluble shaft, a pinion fixed to said shaft, an internal gear in mesh with said pinion, a shell carried by said gear, and a journal member adapted to revolubly support said shell, said journal member comprising upper and lower cylindrical sections formed with recesses at their adjacent ends to receive respectively the pinion and internal gear, each of said members provided with an opening through which said shaft passes, and a side-opening, having its walls formed with grooves therein, a removable block for each shaft opening, guides on said block slidably received in said grooves, and a spring-pressed yoke pivotally connected to said cylindrical sections.

In testimony whereof, I affix my signature in presence of two witnesses.

GLENN G. RHINEVAULT.

Witnesses:
  CHRISTINE A. BRAIDEL,
  GEO. W. SMITH.

---

Copies of this patent may be obtained for five cents each, by addressing the "Commissioner of Patents, Washington, D. C."